United States Patent [19]

Chapline, Jr.

[11] Patent Number: 4,536,883
[45] Date of Patent: Aug. 20, 1985

[54] METHOD AND APPARATUS FOR MOLECULAR IMAGING USING X-RAYS AT RESONANCE WAVELENGTHS

[75] Inventor: George F. Chapline, Jr., Alamo, Calif.

[73] Assignee: The United States of America as represented by the United States Department of Energy, Washington, D.C.

[21] Appl. No.: 445,596

[22] Filed: Nov. 30, 1982

[51] Int. Cl.³ .............................................. G03B 41/16
[52] U.S. Cl. ........................................ 378/36; 378/87
[58] Field of Search ................. 378/36, 3, 87; 350/3.8

[56] References Cited

. U.S. PATENT DOCUMENTS 3,381,127 10/1968 Spielberg ............................ 378/36

OTHER PUBLICATIONS

"Holography at X-Ray Wavelengths", Solem et al., Presented to Proceedings of the Society for Optical and Quantum Electronics, New Orleans, Dec. 1981.
"Holography of Microobjects in X-Rays", Aristov et al., *Optics Communications*, vol. 34, No. 3, 9/80, pp. 332–336.

*Primary Examiner*—Craig E. Church
*Attorney, Agent, or Firm*—Clifton E. Clouse, Jr.; Roger S. Gaither; Judson R. Hightower

[57] ABSTRACT

Holographic X-ray images are produced representing the molecular structure of a microscopic object, such as a living cell, by directing a beam of coherent X-rays upon the object to produce scattering of the X-rays by the object, producing interference on a recording medium between the scattered X-rays from the object and unscattered coherent X-rays and thereby producing holograms on the recording surface, and establishing the wavelength of the coherent X-rays to correspond with a molecular resonance of a constituent of such object and thereby greatly improving the contrast, sensitivity and resolution of the holograms as representations of molecular structures involving such constituent. For example, the coherent X-rays may be adjusted to the molecular resonant absorption line of nitrogen at about 401.3 eV to produce holographic images featuring molecular structures involving nitrogen.

9 Claims, 9 Drawing Figures

METHOD AND APPARATUS FOR MOLECULAR IMAGING USING X-RAYS AT RESONANCE WAVELENGTHS

The U.S. Government has rights in this invention pursuant to Prime Contract No. W-7405-ENG-48 between the U.S. Department of Energy and the University of California.

FIELD OF THE INVENTION

This invention relates to the production of holographic images using coherent X-rays, for imaging microscopic structures, including molecular structures. The invention finds many useful applications, including the molecular imaging of living cells to represent their molecular structures.

BACKGROUND OF THE INVENTION

Holographic images have been produced using visible radiation. This invention relates to the production of holographic images using coherent X-rays, which may be produced by a synchrotron, or by lasers which produce very intense, short-pulsed, high-quantum energy radiation. With such lasers, it is possible to produce high resolution holograms of living cells in three dimensions. Moreover, it is possible to distinguish individual atomic species, and to freeze mechanical action within a cell on the time scale of picoseconds.

SUMMARY OF THE INVENTION

It is an object of the present invention to use coherent X-rays to produce holographic images with sufficiently high resolution and contrast to represent molecular structures and other submicroscopic structures.

To accomplish this and other objects, the present invention preferably provides a method of producing images representing the molecular structure of an object, comprising the steps of directing a beam of coherent X-rays on the object to produce scattering of the X-rays by the object, producing interference on a recording medium between the scattered X-rays from the object and unscattered coherent X-rays and thereby producing holograms on the recording medium, and establishing the wavelength of the X-rays to correspond with a spectral resonance of a constituent of the object and thereby improving the quality of the holograms as representations of molecular structures involving such constituent. Preferably, the X-rays are tuned to a molecular resonance of the constituent.

For example, the constituent may be nitrogen, in which case the X-rays may be produced at a wavelength corresponding to an energy level of approximately 401.3 eV, corresponding with a molecular resonance of nitrogen.

The X-rays may be produced by a synchrotron or a high energy laser, capable of producing coherent X-rays having a wavelength or energy corresponding to the desired molecular resonance line in the X-ray absorption spectrum of the desired constituent. Preferably, the additional steps are followed by enlarging the holographic image and reconstructing an enlarged visual image corresponding to the holographic image, by using coherent radiation in the visible spectrum.

The recording medium may include a photosensitive material. To avoid the graininess of ordinary photographic emulsions, the photosensitive material may be in the form of a photoresist material.

As another alternative, the recording medium may include means for emitting electrons to produce electron images corresponding to the holographic images. The electron images may be enlarged by using an electron microscope.

BRIEF DESCRIPTION OF THE DRAWINGS

Further objects, advantages and features of the present invention will appear from the following description, taken with the accompanying drawings, in which.

DETAILED DESCRIPTION OF ILLUSTRATIVE EMBODIMENTS

Figure 1A:
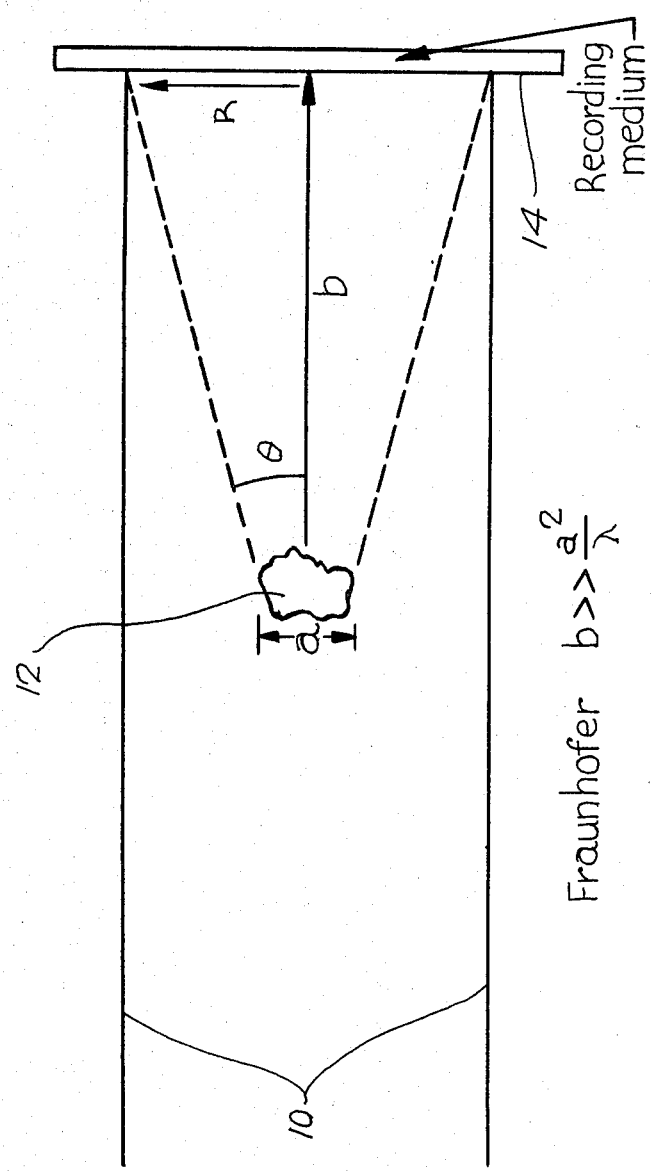
FIG. 1a is a diagrammatic representation of apparatus for producing holographic images using X-rays, by a method known generally as Fresnel transform holography, or Fraunhofer holography.
Figure 2A:
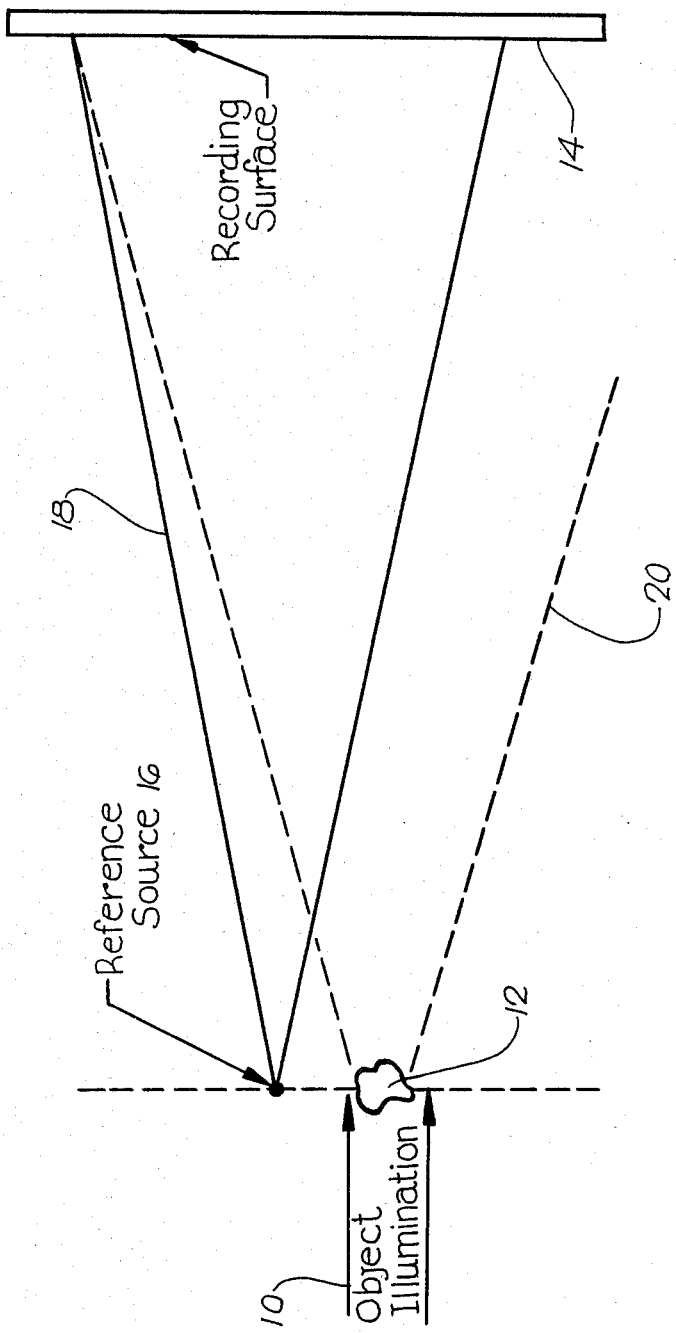
FIG. 2a is diagrammatic illustration of another form of apparatus for producing holographic images by a method known generally as lensless Fourier transform holography.

FIGS. 1a and 2a illustrate two different holographic techniques for making holograms of microscopic specimens with a high-intensity short pulse high-quantum energy laser. FIG. 1a illustrates apparatus utilizing the method of Fresnel transform holography, otherwise known as in-line holography. FIG. 2a illustrates apparatus utilizing the method of Fourier transform holography, sometimes known as lensless Fourier transform holography.

FIG. 1a shows a typical setup for a Fresnel transform holograph. The principal advantage of this technique is simplicity. It requires only one laser beam 10 of coherent X-rays. The object 12 to be holographed is placed in the laser beam itself. The same beam 10 provides both the reference radiation and the illumination for the object 12. When the size of the object 12, divided by the wavelength of the X-rays, is small compared to the distance from the object 12 to the recording medium 14, divided by the size of the object, this method is called Fraunhofer holography. The basic distinction is a certain simplification that can be made in the equations for the interference fringe pattern at the recording medium 14. The hologram on the recording medium 14 is produced due to interference between the X-rays scattered by the object 12 and the unscattered coherent X-rays of the beam 10.

Figure 1B:
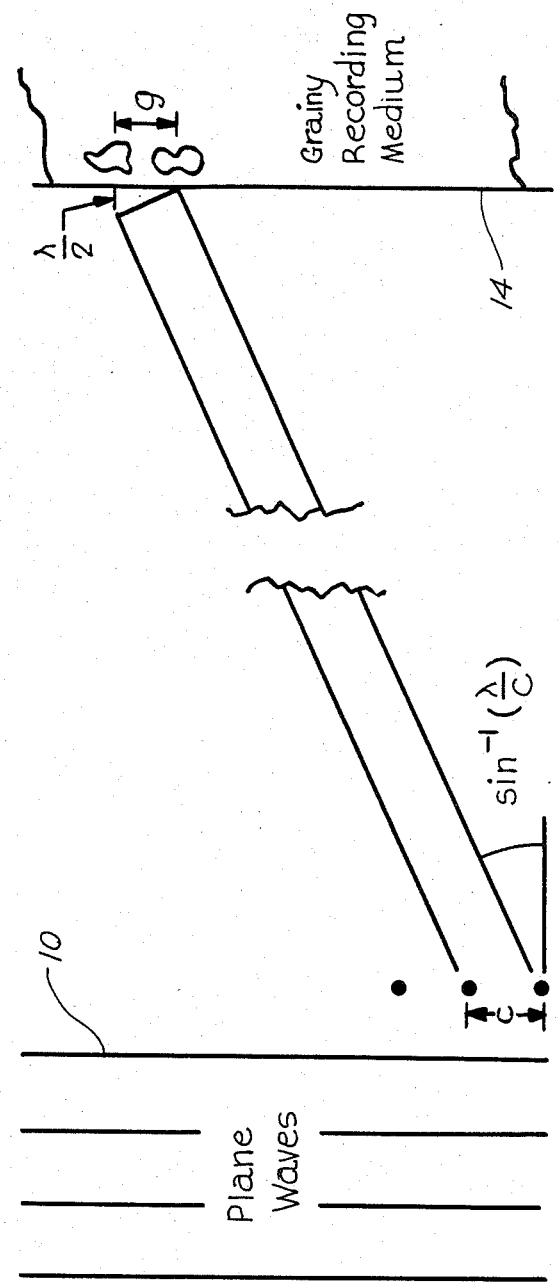
FIG 1b is a diagram illustrating that Fresnel transform holograph is limited by the resolution of the recording medium.

The difficulty of Fresnel transform holography is that it requires a very high resolution recording medium. A feeling for this can be derived from FIG. 1b. If our object consists of a series of point scatterers separated by distance c, it can be thought of as a diffraction grating. The angle at which the first maximum in the diffraction pattern will occur is $\sin^{-1}(\lambda/c)$. This maximum must interfere with the plane waves of the reference beam that are parallel to the recording medium. In order to record the interference pattern between the diffracted beam and the reference beam, the spacing between the grains, g, must be at least large enough for alternating grains to record the maxima and minima of the resulting fringes. Consequently, $g \tan (\sin^{-1}(\lambda/c)) \geq \lambda/2$. For small angles this means $g(\lambda/c) \geq \lambda/2$ or that we must have $c \geq 2g$. The minimum spacing that can be resolved is greater than twice the grain spacing. As long as the angles are small, the result is independent of wavelength.

At large angles, which occur when the wavelength becomes on the order of the size of the grid spacing, this result becomes dependent on the wavelength. This is because the first maximum of the diffraction pattern occurs at a very large angle. This limits the effectiveness of Fresnel transform holography: frequently, the area of reference illumination will be too small to encompass the peak of the diffraction pattern. If $\lambda = c$, the diffraction peak will occur at 90°. The recording medium would have to be infinite in extent to record the first diffraction peak. At large diffraction angles and short wavelengths it is necessary to minimize roughness of the surface of the recording medium as well as intrinsic graininess.

It is also interesting to note that if the structure of the object and the wavelength are appropriate for the object to scatter plane waves, then the interference pattern at the recording medium has a spatial frequency of $(\sin \alpha)/\lambda$ where $\alpha$ is the half-angle of interference.

FIG. 2a shows an idealized configuration for lensless Fourier transform holography. In additition to the laser beam 10, as previously described, the configuration of FIG. 2a includes a reference source 16 which emits spherical X-ray waves 18, adapted to interfere with the scattered waves 20 from the object 12. Such interference occurs at the recording surface 14 to produce holographic images. The object 12 is separately illuminated by a plane wave source which produces the coherent X-ray beam 10. Of course, the wavelength of the X-rays from the reference source 16 must be identically the same as the wavelength of the X-rays in the coherent beam 10.

Figure 2B:
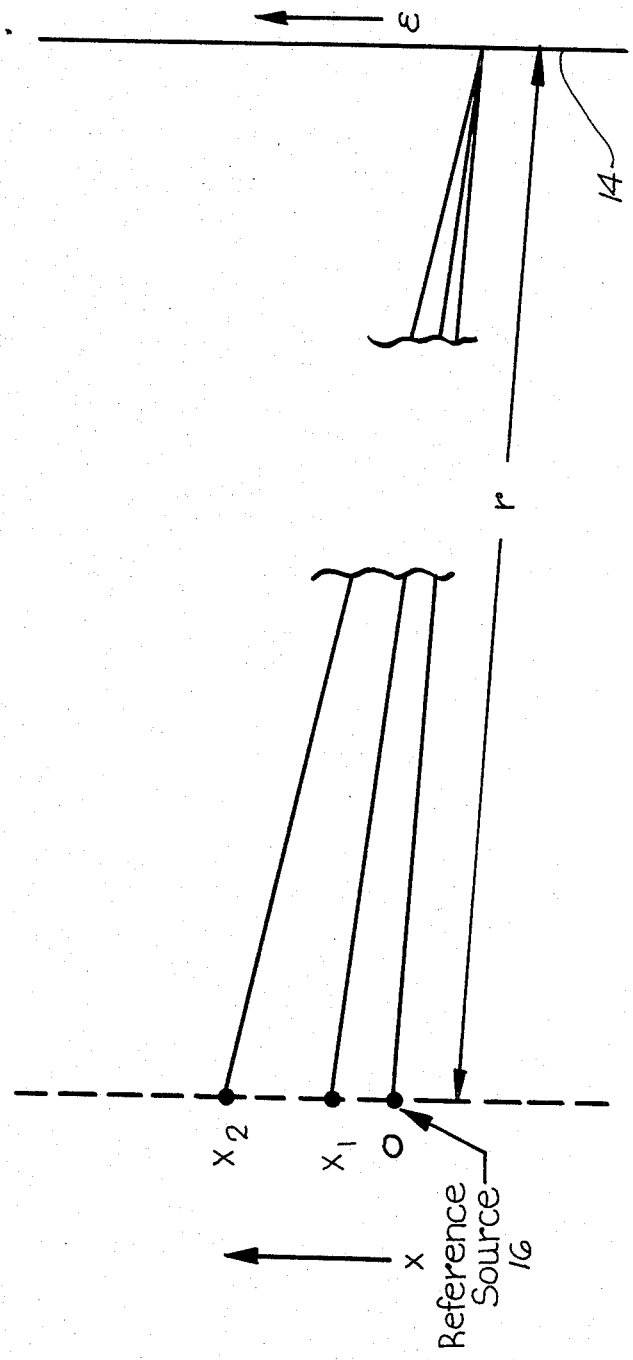
FIG. 2b is a diagram illustrating a simplified arrangement for calculations relating to the holographic method of FIG. 2a, such arrangement consisting of a reference source and two object scatterers.

FIG. 2b shows a simplified arrangement with a reference source 16 and two object point scatterers $x_1$ and $x_2$, all emitting spherical waves originally at the same phase. The intensity pattern at the recording surface will be given by the following equation:

$$I = \frac{A^2}{r^2}\left[ 1 + \frac{4a}{A} \cdot \cos\frac{\pi(x_1 + x_2)\xi}{2\lambda r} \cdot \cos\frac{\pi(x_1 - x_2)\xi}{2\lambda r} \right] \quad (1)$$

In this equation, a and A are amplitudes of the reference and scattered waves, respectively, and $A >> a$. This pattern consists of a dc level plus a rapidly oscillating function with frequency proportional to the mean distance of the two object scatterers from the reference source modulating a slowly oscillating function with frequency proportional to the difference in distance between the two object sources. It is called Fourier transform holography because every distance from the reference source maps to unique spatial frequency at the recording surface. It is lensless because the usual Fourier transforming technique requires a lens. The maximum spatial frequency of the interference pattern can be adjusted arbitrarily by placing the object at various distances from the reference source. Note that difficulty occurs again when spacing of points in the object is smaller than the wavelength, in which case the modulation pattern never reaches a maximum.

It is possible to mitigate the large angle problem by making a spherical recording surface. With the reference source at the origin of the spherical surface and with the two point scatterers spaced therefrom, the intensity pattern consists of bands parallel to the y-z plane and centered on the x-axis. As in the planar case, the spatial or angular frequency consists of a rapid oscillatory function, proportional to the mean distance of the object points from the reference, modulated by a slowly varying function depending on the distance between the object points. Again, if the point spacing is less than the wavelength, a full cycle is never completed. The physical spacing of the fringes can be made arbitrarily large by expanding the radius of the sphere. Thus, it is possible to use an ordinary photographic film of arbitrarily large grain size, as long as the trade-off between sensitivity and resolution is favorable.

To achieve high resolution, Fraunhofer holography, as illustrated in FIG. 1a, requires an essentially grainless recording medium. In fact, no recording medium is truly grainless. Any recording medium is at least grainy on the atomic scale. However, it is possible to obtain resolution far better than that available from the finest grain photographic film. One method is to convert the X-ray image into an electron image by means of a recording medium in the form of a photo-emitting cathode. The electron image is then enlarged with an electron microscope. This has the additional advantage that the electron microscope can be time-gated, thereby extracting information only during the portion of the laser pulse when the best hologram is being generated. It is also possible to employ a high resolution recording medium, having better resolution than photographic film. Thus, the recording medium may comprise a photoresist material, many of which have been developed for high-resolution lithography.

For example, a highly advantageous photoresist material is polymethyl methacrylate (PMMA). Photons striking this plastic material break polymer chains therein, leaving the material locally less resistant to etching agents. PMMA has been used previously in holography experiments at vacuumultraviolet wavelengths. Moreover, PMMA has been used previously in making X-ray shadowgrams, with a resolution of 100 Å.

For making X-ray holograms, it is believed that optimum results are achieved with wavelengths in the 30-50 Å range, using a photoresist such as PMMA. At higher energies, the resolution tends to degrade, because of the increasing range of secondary electrons, and at lower energies the resolution degrades because of diffraction effects. Holograms registered on a photoresist can be read out using an electron microscope, and the image can be reconstructed either by optical laser illumination of the electron micrograph or computer analysis.

In Fraunhofer X-ray holography, as illustrated in FIG. 1a, a problem has been encountered, residing in a low contrast ratio. This is particularly true if the specimen or object is not a very efficient scatterer. This problem can be circumvented by mounting the object or specimen over a hole in an absorbing foil, which will attenuate the reference beam. The uniformity of the shadow foil must be such that spatial and temporal coherence of the reference beam are not drastically altered.

Figure 3:
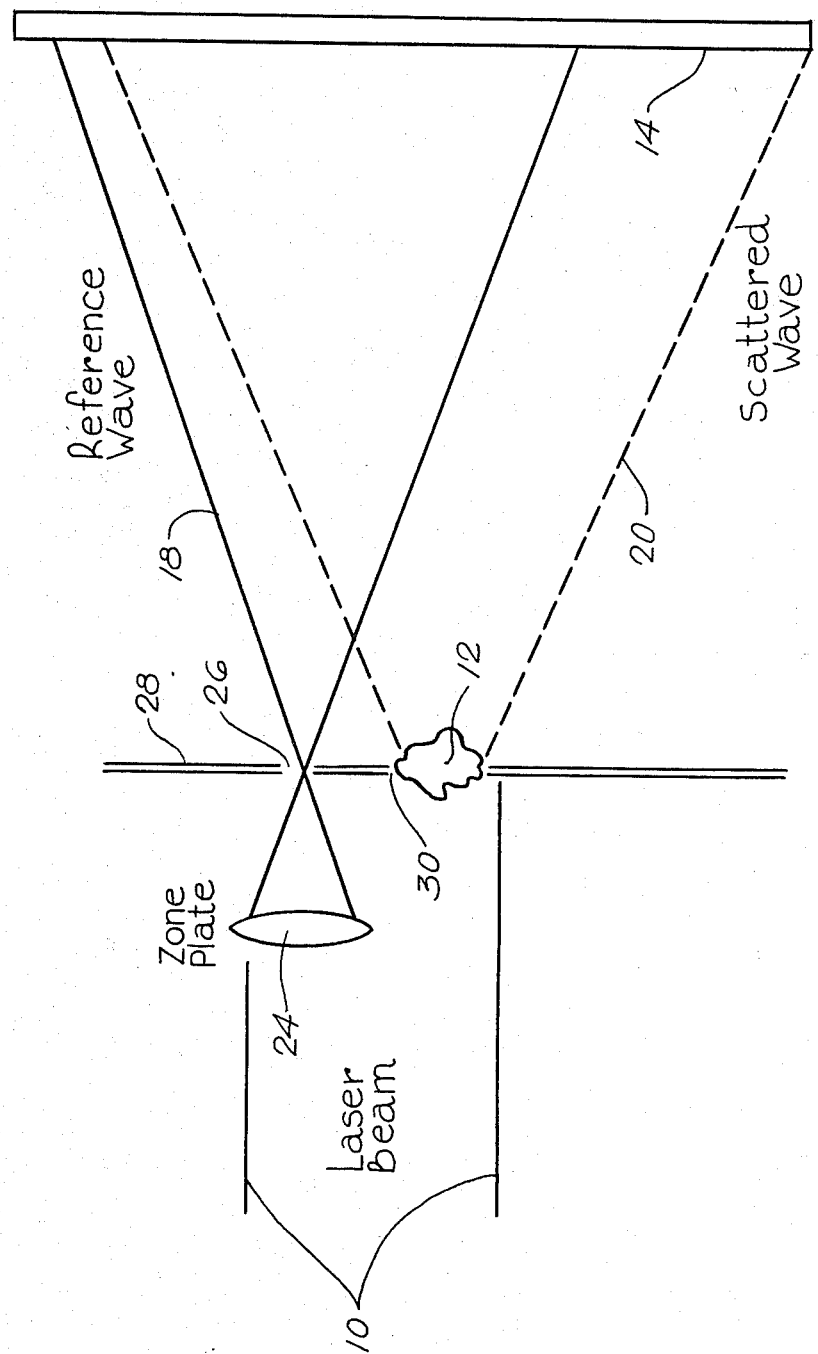
FIG. 3 is a more detailed diagrammatic representation of apparatus for performing lensless Fourier holography.

FIG. 3 shows a more elaborate apparatus for so-called lensless Fourier transform holography, which is not truly lensless. In order to obtain the spherical reference wave 18, the apparatus of FIG. 3 includes a Fresnel zone plate 24 which focusses a portion of the coherent X-ray beam 10 to a pinhole 26 in a flat shadow plate 28. Thus, for X-rays, the zone plate 24 is the equivalent of a lens. The object or specimen 12 is mounted in a hole 30 in the shadow plate 28. With this configuration, the hologram resolution is limited to the finest spacing of the Fresnel zone plate. This factor limits the resolution which can be achieved. For example, it is difficult to achieve a zone plate spacing less than about 800 Å. For such a zone plate, the hologram resolution is limited to about 800 Å.

Figure 4:
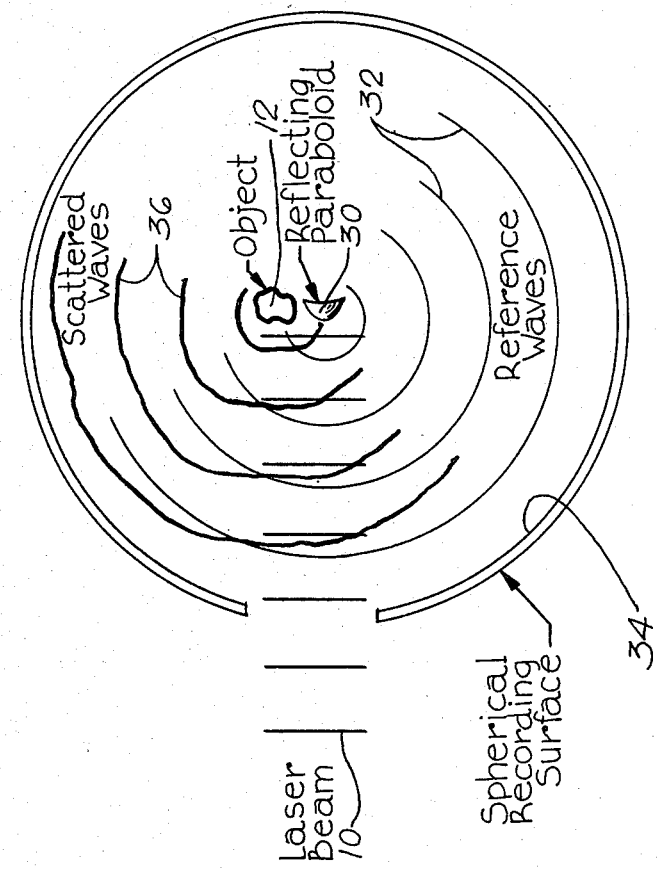
FIG. 4 is a diagrammatic illustration of another form of apparatus for performing Fourier transform holography, utilizing a parabolic reflector and a spherical recording medium.

FIG. 4 illustrates another apparatus for carrying out Fourier transform holography, using X-rays. The apparatus of FIG. 4 includes a coherent scattering reflector 30 in the form of a paraboloid, to generate spherical reference waves 32, by reflecting the coherent laser beam 10. The reflector 30 is enclosed in a recording surface in the form of a spherical shell 34. For best contrast ratio, the paraboloid reflector 30 should be approximately the same size as the object 12. For example, if the object 12 is a biological specimen having a size of about 100 microns, the paraboloid reflector 32 should have a size of about 100 μm. While the reflector is preferably a paraboloid, this is not absolutely necessary. In principle, the hologram can be unfolded for any convex reference scatterer, as long as its shape and dimensions are known within a fraction of a wavelength. Thus, the reference reflector may be in the form of a spherical microballoon, which can be made as small as 100 μm in diameter with a surface smoothness better than 100 Å. The balloon can be measured to within 50 Å. The balloon reflector is usable in the 30-50 Å region.

In the apparatus of FIG. 4, the spherical reference waves produce interference with the waves 36 scattered by the object 12. Such interference produces holographic images on the interior surface of the spherical recording medium 34.

The intensity requirements for X-ray holography involve consideration of the following expression which defines the stagnation time for a heated region:

$$T_{stag} \sim \frac{\delta}{\sqrt{C_v \theta}} \quad (2)$$

In this expression, $\delta$ is the linear dimension of the region, $C_v$ the specific heat at constant volume, and $\theta$ the temperature. Under the assumption that the hologram can be recorded without blurring for a period on the order of $T_{stag}$ time, the required intensity is given by the following expression:

$$I \sim \frac{1}{K} \sqrt{\left(\frac{Nh\nu}{\sigma_{elas}\rho}\right)^3 \frac{\sigma_{abs}}{\delta^{11}}} \quad (3)$$

In this expression, N is the number of photons to be recorded per resolution element, $h\nu$ is the photon quantum energy (ergs), $\epsilon$ is the detector quantum efficiency, i.e. the fraction of photons recorded, $\sigma_{elas}$ is the elastic cross section (cm$^2$/atom), $\sigma_{abs}$ is the absorption cross section (cm$^2$/atom), $\rho$ is the density (g/cm$^3$), K is the number of atoms per gram, i.e. $6.02 \times 10^{23}/A$ (atoms/g), and $\delta$ is the linear resolution element (cm).

The exposure time (the time during which the hologram is recorded) must be less than the stagnation time. This can be accomplished by arranging for the laser pulse length to be shorter than the stagnation time, either by designing a laser with a natural short pulse or using any of a variety of mechanisms for chopping the pulse. A gated recorder, such as any of the electron photoemissive schemes, can also provide a shutter and allow the laser pulse length to exceed the stagnation time. With a reflective-reference scheme such as that shown in FIG. 4, a coherent-scattering resonance and laser intensity are selected such that the resonance saturates in a time less than the stagnation time. This resonance used both in the reference reflector and the object provides a natural shutter. When the resonance saturates, both the object and reference scatterer become transparent to the laser beam, and generation of the hologram ceases. Unfortunately, this shutter scheme cannot be used very effectively with Fresnel holography and a photoresist recording surface, for after the resonance saturates (bleaches), the laser will continue to expose (darken) the photoresist. The laser pulse length can be a factor of two or three greater than the saturation time, but any further exposure would unacceptably degrade the contrast ratio.

The required intensity goes as $\delta^{-11/2}$. This derives from the increase in intensity required to get the same number of photons scattered off a smaller resolution element and the shorter stagnation time as the resolution element becomes smaller. This equation is only applicable in the region where the specimen is behaving like a fluid and there is a local thermodynamic equilibrium. But it does give a feeling for the rapid increase in intensity required as higher resolution is sought.

The intensity is strongly dependent on the elastic cross section and somewhat more weakly dependent on the absorption cross section. To make holography practical on the 30-50 Å scale, it is necessary to use resonant coherent scattering. The resonant cross section is given by the Breit-Wigner formula and to within multiplicity factors is approximately $$\delta \sim \lambda^2 \left(\frac{\Gamma_{res}}{\Gamma_{nat}}\right)^2 \quad (4)$$

where $\Gamma_{res}$ is the resonant linewidth and $\Gamma_{nat}$ is the natural linewidth.

Figure 5:
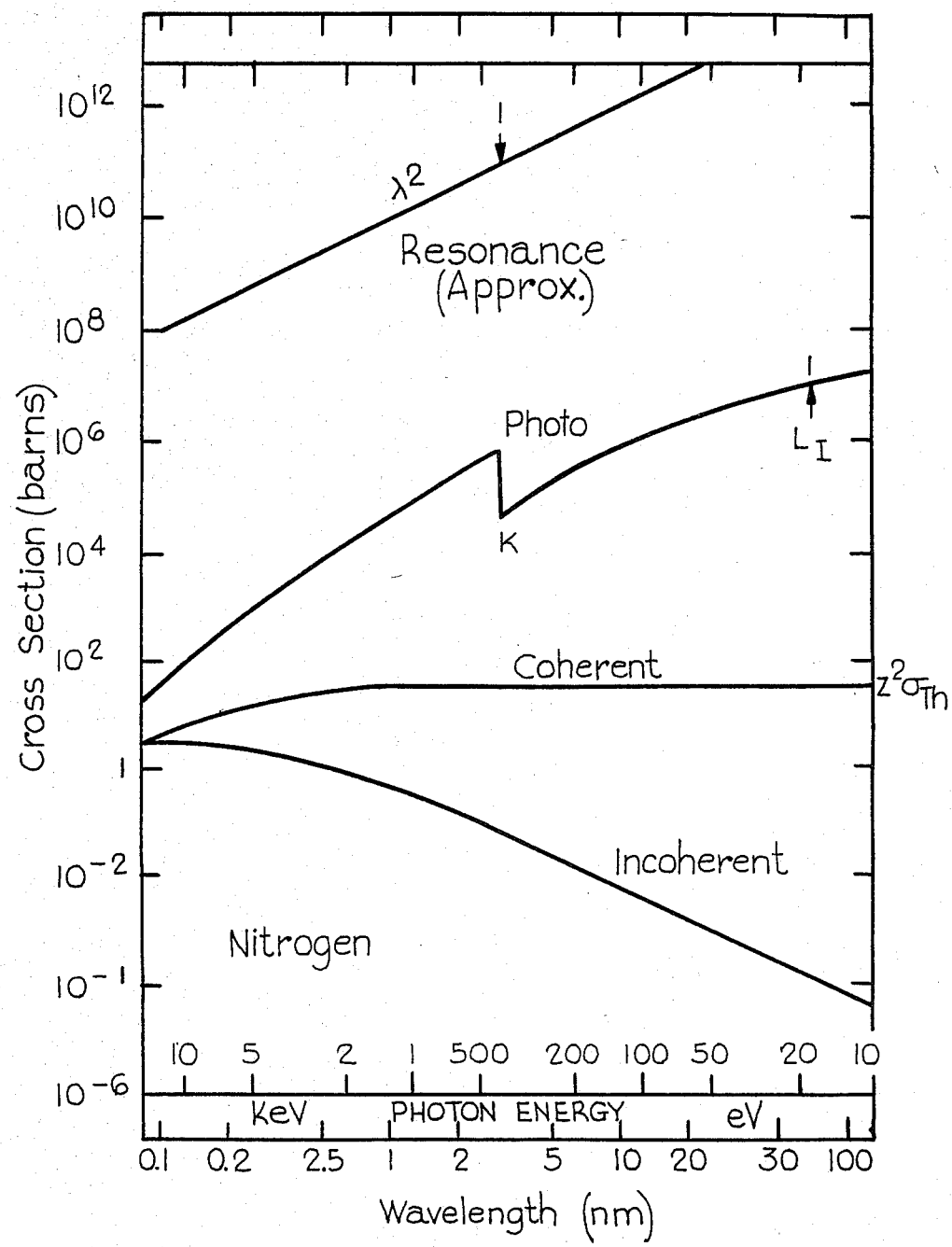
FIG. 5 is a set of graphs representing the absorption cross sections for photoelectric effects, coherent scattering, and incoherent scattering in nitrogen, compared with molecular resonant scattering, as approximated by the square of the wavelength, within multiplicity factors.

FIG. 5 compares $\lambda^2$, which is a reasonable approximation to the resonant cross section, with the cross section for photoelectric effect, coherent scattering, and incoherent scattering in nitrogen.

To see how important it is to use resonant coherent scattering, a concrete example may be considered. Suppose that it is desired to make a hologram of a microscopic structure of solid nitrogen to a linear resolution of 50 Å. Further, suppose that it is desired to scatter coherently $10^3$ photons from each resolution element. Using nonresonant coherent scattering, the elastic cross section is about $4 \times 10^{-22}$ cm$^2$. The absorption cross section is about $4 \times 10^{-20}$ cm$^2$. This gives an intensity of approximately $10^{18}$ watts/cm$^2$ and a stagnation time of $10^{-14}$ s. This is clearly unreasonable.

On the other hand, if the nitrogen is prepared in a He-like state, it is possible to use the 2P-to-1S resonance in He-like nitrogen that occurs at about 431 eV. In the He-like state, the atoms would have no Auger transitions, although there may be some contribution to the linewidth from inelastic collisions with free electrons, and from Stark broadening. However, the resonant linewidth would closely approach the natural linewidth. Even though the temperature would be nearly 50 eV, Doppler broadening would be negligible. Therefore, the elastic cross section would be about $10^{-16}$ cm$^2$. This would give an intensity of $10^{10}$ watts/cm$^2$ and an observation time of about $10^{-11}$ s. It reduces the intensity requirement by eight orders of magnitude and makes the stagnation time 10 picoseconds which seems at least tractable. Also, the illumination on the recording surface is about 0.1 J/cm$^2$ which is within the dynamic range of practical photoresists. Although Doppler broadening is negligible, Doppler shifting of the coherently scattered photons may alter the phase relationship with the reference beam at the recording surface. This could impose an upper limit on the distance from the specimen to the recording surface.

Formula 3 is not strictly applicable to this case, however. The formula would assume that the nitrogen starts cold in the He-like state. In fact, enough energy must be applied to bring it to that state, and during that time it is dilating hydrodynamically. If an absorption resonance of about $3 \times 10^{-17}$ cm$^2$ could be employed until the He-like state is reached, then an intensity of about $3 \times 10^{12}$ watts/cm$^2$ would be required, a stagnation time of about $\frac{1}{3}$ picosecond would be encountered, and the fluence on the recording surface during registration of the hologram would be about 1 J/cm$^2$. Doing this, however, requires a fortuitous overlap of resonances. An alternative might be to direct a second laser at the specimen, perpendicular to the laser that would resonate with the He-like state. The second laser would be tuned to the K-edge and heat the specimen to the desired population of the He-like state. This would improve the contrast ratio and does not depend on any fortuitous overlap of resonances. The second laser would have to supply about $10^{13}$ watts/cm$^2$, however.

Figure 6:
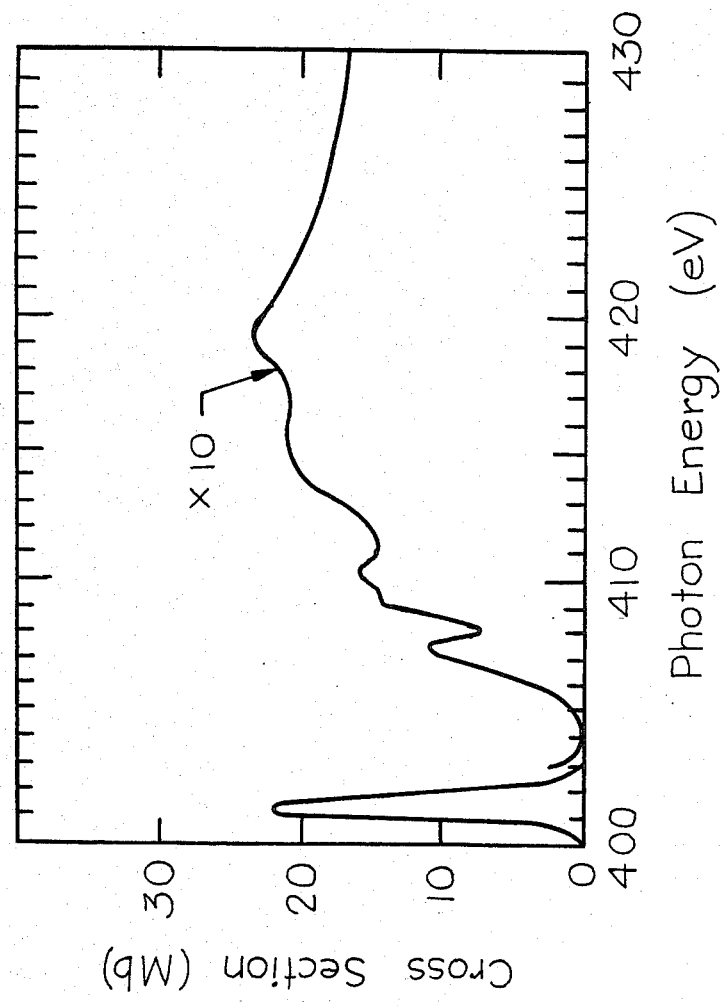
FIG. 6 is a graph illustrating the K-shell absorption spectrum of molecular nitrogen, as determined photoelectrically, showing a large resonance peak at 401.3 eV, illustrating molecular resonance.

For a more realistic example, cold resonances should be considered. FIG. 6 shows the X-ray absorption cross section of molecular nitrogen in the range from 400–435 V as reported by Bianconi et al. in Phys. Rev. A 17, 1907–1911 (1978). A resonance occurs at about 401.3 eV owing to the promotion of a 1S electron to the first unfilled ($\pi_g$2P) orbital. While the total cross section of this resonance exceeds 22 Mb, its fluorescent yield, that is the fraction of its cross section that is coherent scattering, is only a part in $10^3$. However, a real cell is not constructed of pure nitrogen and the accompanying atomic species provide a heat sink for energy deposited by noncoherent scattering processes. This somewhat depresses the rate of dilation and increases the stagnation time. This resonance is, of course, for $N_2$, but one would expect that a similar resonance would be encountered for nitrogen bound in the proteins of a cell, and that it would occur at a similar energy. This is because if a first vacant orbital exists, it will differ from the one in $N_2$ only by a fraction of the molecular binding energy. For example, the corresponding resonance in $N_2O$ occurs at 401.2 eV, only 0.1 eV from the one in $N_2$. For a realistic cell containing appropriate concentrations of H, C, O and N, the theoretical resolution is on the order of 200 Å, because the strong absorption of the $N_2$ resonance makes protein concentrations appear almost black. To record the hologram on a standard photoresist, a laser intensity is needed on the order of $10^{12}$ w·cm$^{-2}$.

Figure 7:
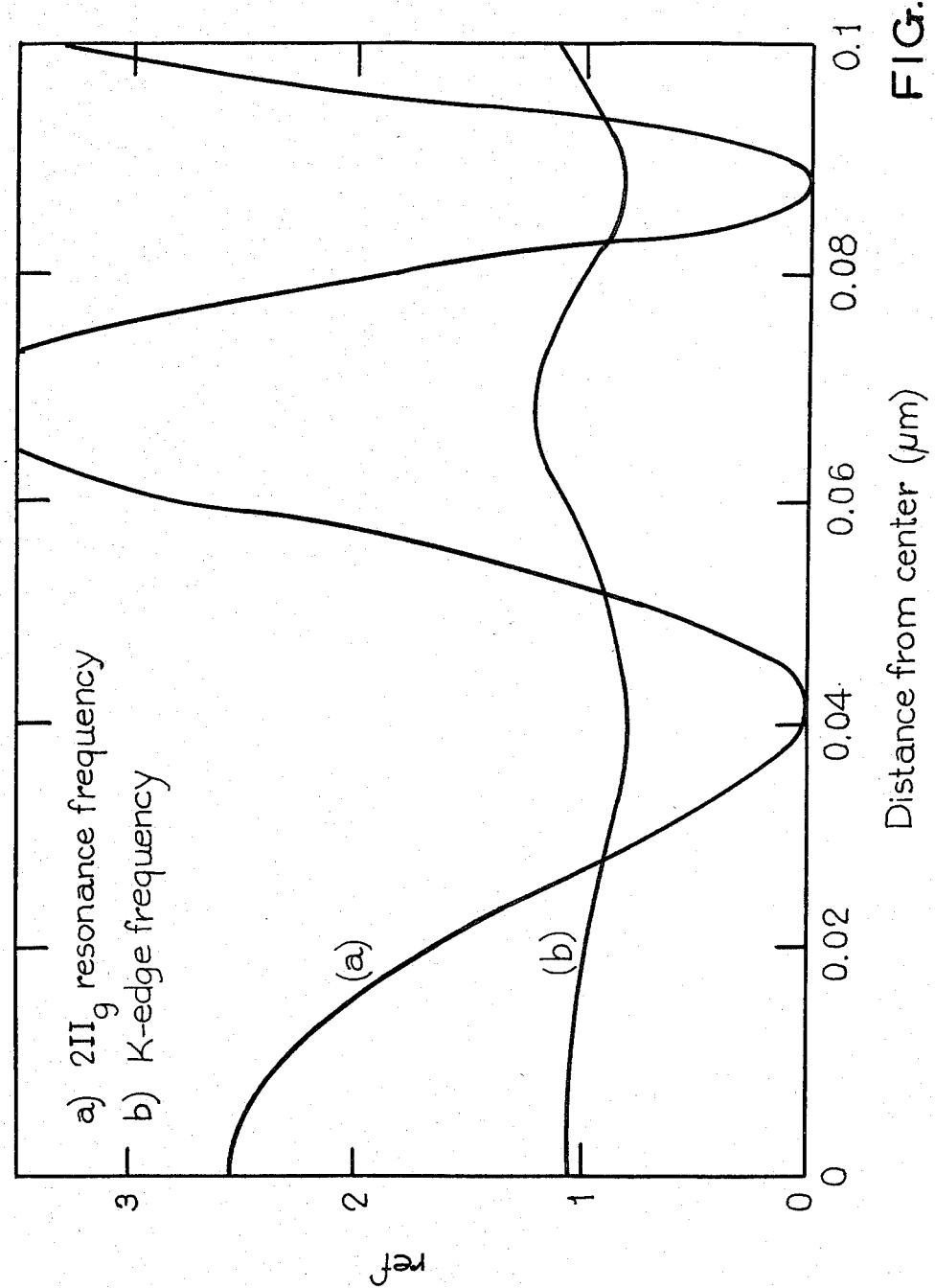
FIG. 7 is a set of graphs representing holographic X-ray images obtained at a molecular resonance frequency and a K-edge frequency, showing the improvement in resolution and contrast when the resonance frequency is used.

FIG. 7 comprises a set of graphs to compare X-ray holograms made with and without the use of resonance. These graphs represent the intensity variations of holograms, plotted against the distance from the center of the holograms. Graph (a) represents an X-ray hologram produced with the coherent X-rays established at the molecular resonant frequency of nitrogen. Graph (b) represents the hologram produced with the coherent X-rays established at the K-edge frequency, rather than the molecular resonant frequency. It will be evident that the tuning of the coherent X-rays to the molecular resonant frequency produces a hologram having greatly superior quality, as to sensitivity, contrast and resolution. The intensity ratio and the intensity variation are much improved by tuning the coherent X-rays to the resonant absorption line frequency.

As indicated in the preceding discussion, it is highly advantageous to adjust or tune the wavelength or energy of the coherent X-rays to coincide with a molecular or spectral resonance of a constituent of the matter or object, of which holographic X-ray images are being made. In the case of biological specimens, nitrogen may well be the constituent which is selected. Nitrogen is an advantageous atomic species to select for detection within a cell. Looking at nitrogen serves to distinguish some of the more interesting aspects of cellular structure, while ignoring the water, the sugars, and the lipids. The imaging of nitrogen makes it possible to see the membranes, the cytoskeleton, the nucleus, the mitochondria, and various other organelles. This is a distinct advantage over the electron microscope which, when used to examine living cells, does not distinguish the water from the structural elements without special preparation. In general, electron microscope samples must be freeze-dried and sputtered with a high-Z element such as osmium or uranium. It is generally thought that the cellular organization is radically disturbed by this process.

X-ray holography makes it possible to take snapshots of mechanical processes within the cell on picosecond time scales. For example, it may be possible to see the penetration of vesicles of neurotransmitter through the presynaptic membrane. Also, with a resolution of approximately 100 Å, it may be possible to detect switches in molecular conformation such as those thought to be responsible for signal promulgation in retinal cells.

It is believed that the method of FIG. 1a of making X-ray holographic images is particularly advantageous, with a photoresist as the recording medium. It is important to employ coherent X-rays having a wavelength or energy corresponding to a spectral resonance of the constituent, such as nitrogen, which is to be detected. The recording properties of the photoresist are optimum in the wavelength region which is needed to use the resonant coherent scattering of nitrogen. To produce a favorable contrast ratio, it is advantageous to employ a shadow foil that is sufficiently homogeneous so that it does not significantly alter the temporal and spatial coherence of the reference X-ray beam. It is highly important to employ resonant coherent scattering to obtain holograms at reasonable intensities.

I claim:

1. A method of producing images representing the molecular structure of an object, comprising the steps of directing a beam of coherent X-rays upon the object to produce scattering of the X-rays by the object, producing interference on a recording surface between the scattered X-rays from the object and unscattered coherent X-rays such that holograms are produced on said recording surface, and establishing the wavelength of the X-rays to correspond with a spectral resonance of a constituent of said object so as to improve the quality of the holograms as representations of molecular structures involving such constituent.

2. A method of producing images representing the molecular structure of an object, comprising the steps of directing a beam of coherent X-rays upon the object to produce scattering of the X-rays by the object, producing interference on a recording surface between the scattered X-rays from the object and unscattered coherent X-rays such that holograms are produced on said recording surface, and establishing the wavelengths of the X-rays to correspond with a molecular resonance of a constituent of said object so as to improve the quality of the holograms as representations of molecular structures involving such constituent.

3. A method according to claim 2, in which the coherent X-rays are established with a wavelength corresponding to an energy level of approximately 401.3 eV to correspond with a molecular resonance of nitrogen such that holograms are produced representing molecular structures involving nitrogen.

4. A method of producing images representing the molecular structure of matter, comprising the steps of exposing the matter to coherent X-rays to produce scattering of said X-rays by said matter, said X-rays being produced with a wavelength corresponding to a resonant absorption line in the X-ray absorption spectrum of a constituent of said matter, producing interference between the scattered X-rays and unscattered coherent X-rays such that a holographic image is produced on a recording medium representing molecular structures involving such constituent.

5. A method according to claim 4, including the additional steps of enlarging the holographic image, and reconstructing an enlarged visual image corresponding to the holographic image.

6. A method according to claim 5, in which said enlarged visual image is reconstructed by means of coherent radiation in the visible spectrum.

7. Apparatus for producing images representing the molecular structure of an object, comprising means including a source of coherent X-rays for directing coherent X-rays upon the object to produce scattering of the X-rays by the object, and a recording medium spaced from the object, said means affording interference on the recording medium between the scattered X-rays and unscattered coherent X-rays to produce a holographic image on said recording medium, said source producing coherent X-rays of a wavelength corresponding to a spectral resonance of a constituent of said body such that said holographic image represents molecular structures involving said constituent.

8. Apparatus according to claim 7, in which said recording medium includes a photosensitive material for recording holographic images.

9. Apparatus according to claim 7, in which said recording medium includes means for emitting electrons to produce electron images corresponding to the holographic images.

* * * * *